United States Patent
Rosecrans et al.

[11] Patent Number: 5,889,852
[45] Date of Patent: Mar. 30, 1999

[54] PHOTO SCREEN SCROLL GRAPHIC USER INTERFACE

[75] Inventors: Michael W. Rosecrans, Santee; Mitchell Simon, San Diego, both of Calif.

[73] Assignee: Nokia Mobile Phones Limited, Salo, Finland

[21] Appl. No.: 798,521

[22] Filed: Feb. 10, 1997

[51] Int. Cl.$^6$ .................................................. H04M 1/00
[52] U.S. Cl. .................. 379/355; 379/93.23; 379/93.19; 379/142
[58] Field of Search .............................. 379/93.23, 93.17, 379/93.19, 204, 205, 206, 355, 354, 356, 357, 142; 348/14–19

[56] References Cited

U.S. PATENT DOCUMENTS

| | | | |
|---|---|---|---|
| 5,414,457 | 5/1995 | Kadowaki et al. | 348/14 |
| 5,422,656 | 6/1995 | Allard et al. | 345/173 |
| 5,457,738 | 10/1995 | Sylvan | 379/96 |
| 5,609,508 | 3/1997 | Wingate | 446/142 |
| 5,657,378 | 8/1997 | Haddock et al. | 379/93.23 |

*Primary Examiner*—Fan S. Tsang
*Assistant Examiner*—Shih-Wen Hsieh
*Attorney, Agent, or Firm*—Perman & Green, LLP

[57] ABSTRACT

A Graphic User Interface, for use with electronic phonebooks, links graphic information, e.g., a graphic identifier such as a logo or picture, to a phone number that may be called using the graphic identifier. The Interface, incorporated in a telephone, enables users to send stored graphical information, tied to selected phone numbers, to other users' phones for use or storage, by scrolling through stored graphics, displayed by the Interface on the phone, to locate a graphic associated with a person or place to be called, and then, by pressing the SEND, the particular phone number or numbers linked to the selected graphic are activated and the call or calls are made. When a connection is established with a receiving number, a set of stored graphics with tied numbers may be downloaded from the memory of the sending phone to the memory of the receiving phone for similar use. The Interface can be utilized, e.g., by Advertisers to send logos/graphics and numbers to phones that are turned ON in a particular area to receive the graphical information and create area specific databases of their own in memory including the graphic associated numbers of persons and places that a receiving phone may use to call in the same manner. General advertising information may also be transmitted with graphics and tied phone numbers for viewing and response.

14 Claims, 1 Drawing Sheet

PHOTO SCREEN SCROLL GRAPHIC USER INTERFACE

BACKGROUND OF THE INVENTION

1. Field of the Invention

The present invention relates to telephones and, more particularly, to telephones, such as cellular phones, containing electronic phonebooks and a Graphic User Interface for such phonebooks.

2. Prior Art

In the new wireless world, people do not think of connecting with a place, a phone number, or a name, such as found in a phone directory, but rather with a particular person or entity. Still, existing phone equipment for the most part requires directory-type dialing or data entry in memory for normal functioning instead of being more compatabile with the present mobile, intuitive society. Also, currently, computers, the Internet, and PDAs have become more icon-based, so that cellular phone and PCS handsets should be more graphically oriented, particularly in view of the availability of Dot Matrix Displays which can allow cell phones to display graphics, logos, and black & white pictures.

Current telephones, including cellular phones, have the capability of storing names and numbers in an electronic phonebook, but the user must manually enter the information and then remember which person or place is related to the name or number when accessing the information later. The user may get some respite from number entry with this technology since the phone can be automatically dialed using the information if it is properly recalled. In this regard, present SMS technology allows for the ability to send an alphanumeric message tied to a phone number, but in general there is a need for a more user-friendly format with more use of graphics and reduced burdensome user input in sending and managing messages and information.

Problem to be Solved

Present phone technology is still not sufficiently user-friendly and digital cellular phones need to utilize greater graphical capabilities to offer enhanced, easier, informative, and more personal service.

Objects

It is accordingly an object of the present invention to provide telephones, including cellular phones, with a capability that allows the user to tie a picture, icon, or other graphical representation to a person, place, or entity so that recognition can be quick and easy and the icon may be used to initiate a phone call to the tied person.

It is another object of the invention to provide a telephone, such as a cellular phone, with the capability of sending and receiving graphical and phone number information.

It is a further object of the invention to provide a phone, such as a cellular phone, with a Graphic User Interface for use with an electronic phonebook in accessing graphical information tied to selected phone numbers stored in the phonebook and sending the graphical information and tied numbers to a graphically selected receiving phone.

SUMMARY OF THE INVENTION

The present invention is directed to a Graphic User Interface, for use with electronic phonebooks, that links graphical information, e.g., a graphic identifier such as a logo or picture, to a phone number that may be called using the graphic identifier when displayed by the Interface. Also, the Interface, which may be incorporated in a telephone, enables users to send stored graphical information tied to selected phone numbers to other users' phones for use or storage. In operation, a user can scroll through stored graphic images, displayed by the Interface on the phone, to locate a graphic associated with a person or place to be called. Then, by pressing the SEND, while the selected graphic is being displayed, the particular phone number or numbers linked to the selected graphic are activated and the call or calls are made. When a connection is established with a receiving number, a set of stored graphic images with tied numbers may be downloaded from the memory of the sending phone to the memory of the receiving phone for similar use.

The invention may be implemented in all types of phones, including cellular phones, and can be utilized, e.g., by advertisers to send logos/graphics and numbers to phones that are turned ON in a particular area to receive the graphical information and create area-specific databases of their own in memory including the graphic associated numbers of persons and places that a receiving phone may use to call in the same manner.

DETAILED DESCRIPTION OF THE PREFERRED EMBODIMENTS

The present invention involves the provision of a Graphic User Interface for use with telephones containing electronic phonebooks, which Interface links graphical information, e.g., a graphic image or logo or picture, stored in the phonebook to one or more selected phone numbers, also stored in the phonebook, to enable the calling of a number using the graphic image and the sending of related graphical information with linked numbers to the selected phone numbers. A preferred embodiment of Graphic User Interface for electronic phonebooks in accordance with the invention draws upon three technologies used in existing digital cellular phones. The three are:

1. Electronic Phonebook technology whereby current cellular phones can store names and/or numbers that are manually entered into a phone memory or database by a user;

2. Digital messaging technology whereby a phone can communicate with other phones with an alphanumeric message tied to a phone number; and 3. Dot Matrix Display technology whereby cell phones are able to display graphics, logos, and "black & white" pictures.

Figure 1:
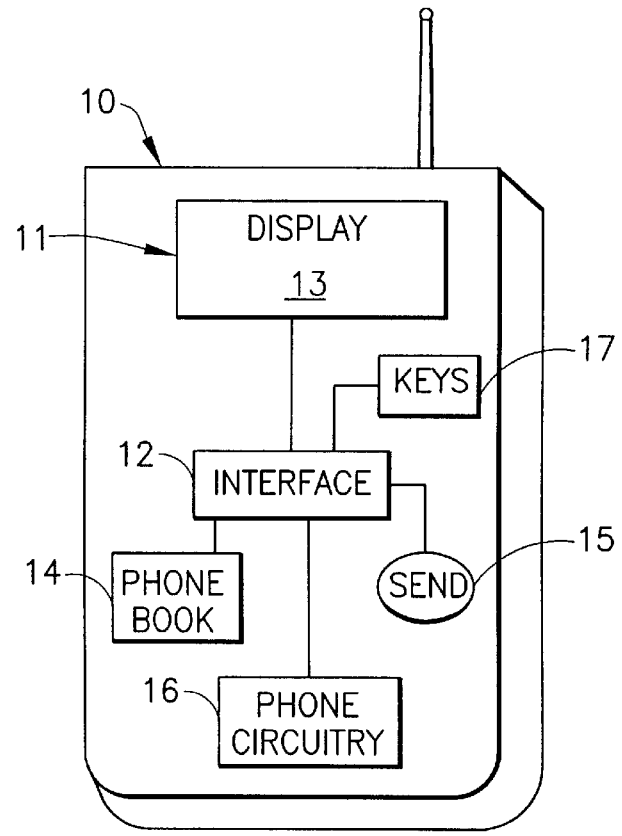
FIG. 1 is a perspective view illustrating an example of a cellular telephone for use with the present invention.

Through the linking and combining of features of these three technologies the invention enables users, companies, and advertisers to use graphic images for making phone calls and to exchange graphics, that are tied to phone numbers, and to store this exchanged information in the memory of their phones. An example of a phone for use with a the invention is shown in FIG. 1 in the form of a cellular phone 10, including a display 11 adapted, by means of an Interface unit 12, to present graphic images 13. The images 13 are graphic identifiers and may be stored in a separate Graphic phonebook in the Interface unit 12, or in the phone's electronic phonebook 14, along with tied phone numbers and optionally other tied information. This tying may be accomplished by means of an information database with fields for storing pixel information of the image and fields for storing the phone number or numbers and other tied information, with both the image and phone numbers being accessed by the use of the same value or index into the database. Alternatively, one database record may hold both an image's pixel information and the phone numbers and other information tied to that image.

A user wishing to make a phone call, for conversation or for sending graphical/phone number information to another, scrolls through the different images or logos or pictures 13 on the phone display 11 for one that identifies the location or person to be called. Scrolling may be accomplished by pressing a key or keys on a keypad 17 to read forwards and backwards through the records in a database stored in the Graphic phonebook of the Interface unit 12 or a database of the electronic phonebook 14, and displaying the image fields 13 of the records read on the display 11. Each key press on keypad 17 may index an increase or a decrease in the order of the database records. This scrolling may be used to merely display a stored image for viewing purposes, such as a picture of a family member; but, more importantly, it also may be used for displaying a series of graphic identifiers 13 which have related stored images and numbers. Accordingly, each graphic identifier 13, having one or more tied phone numbers stored with it in a memory in Interface unit 12 or in the phonebook memory, may be viewed until the one that identifies the location or person to be called appears. Selection of the desired location or person is then accomplished, when the graphic identifier 13 associated with or corresponding to a desired location or person is displayed while scrolling, by ceasing scrolling and activating the phone. The phone may be activated by pressing the SEND button 15 while the associated graphic identifier 13 is being displayed, which causes the Interface unit 12 to activate the phone circuitry 16 to place a call to the location or person without other involvement of the user with the tied phone number. Thus, a user is able to call another person or location without having to remember or to dial the phone number of that person.

Figure 2:
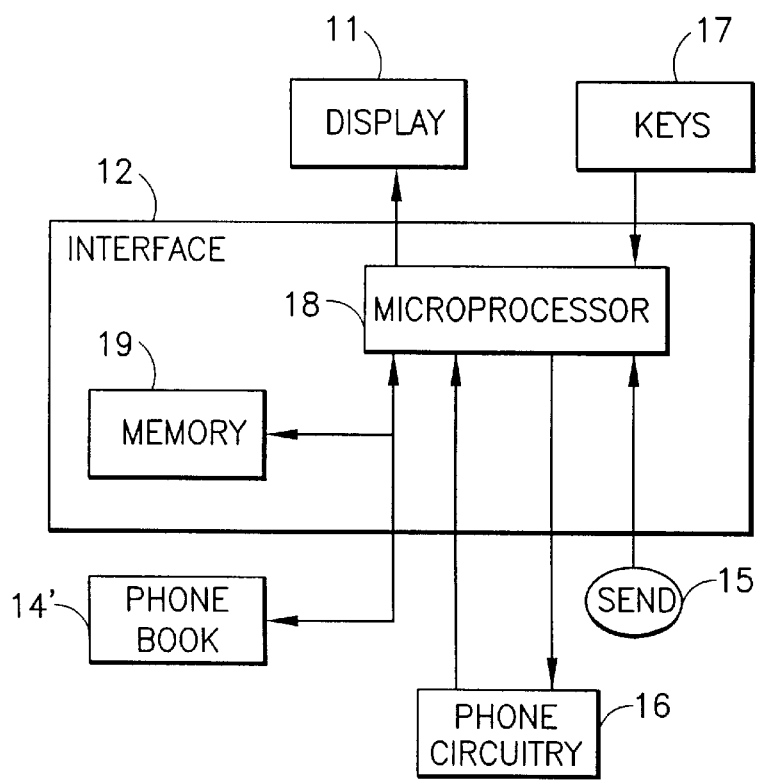
FIG. 2 is a block diagram illustrating an exemplary set of operating components and their cooperation for producing a call.

FIG. 2 is a block diagram showing an exemplary set of operating components and their cooperation for producing a call. The Interface unit 12 contains a microprocessor 18 and an optional memory 19 for storing graphic identifiers and, optionally, one or more tied phone numbers and/or graphics with them. The microprocessor 18 has inputs from memory 19 and the phonebook memory 14' as well as from keypad 17, which controls the image information from memory 19 and/or memory 14' provided to display 11. An input from SEND key 15 will produce an appropriate output from microprocessor 18 to the phone circuitry 16 to call the phone number tied to the graphic identifier being viewed on display 11. Thus, the number to be called is selected by viewing the graphic identifier tied to the desired number and pressing the SEND key 15.

Once the sending and receiving phones are connected for transmission, a conversation may be held, or a message sent, or information may be forwarded from the sending phone's memory. The information sent to the receiving phone or phones may include the graphic identifier and/or other graphics, along with further tied phone numbers, for immediate selection at, or storage in a database in, the receiving phone. For example, as indicated in FIG. 2, when the call has been completed, the phone circuitry 16 can provide a signal to the microprocessor 18 to send or download appropriate stored information, such as graphical information and/or phone numbers, from memories 19 and/or 14' to the receiving phone at the number that has been called. Consequently, the receiving phone can be enabled to perform storage and display and graphic identifier dialing in the manner of the sending phone without the need for any other data entry by the receiving phone user.

The existing technologies are preferably combined in the manner of the invention by a software-based Interface unit 12 that provides for the creation of a Graphic phonebook file or database, in memory 19 or memory 14', which enables the graphic identifiers to be tied to one or more phone numbers in an electronic phonebook accessible through the Interface. In addition, this database may tie the graphic identifiers to other graphics and phone numbers which may be sent, using the Interface, to other phone users for incorporation in other like databases in their Graphic electronic phonebooks. Further, the graphic identifiers can be tied to messages and other information. As a result, graphic images can be used as location holdings for further information, as well as phone numbers. The Graphic electronic phonebooks may be permanent in nature or location-specific temporary phonebooks.

A specific example of the use of communicating phones incorporating an Interface in accordance with the invention is as follows. Joe and Jane, who have appropriately equipped phones, meet each other and want to keep in touch. Each has a personal picture with a tied phone number in their Graphic User Interface electronic phonebooks. Joe transmits or downloads his picture/number to Jane for storage in her Graphic phonebook and she transmits or downloads her picture/number to Joe for like storage. Then, when Joe wishes to call Jane, he scrolls through the pictures of people stored in his Graphic phonebook until Jane's picture is displayed, whereupon he presses SEND and the phone calls Jane's number. Neither need remember the phone numbers or get involved in dialing them. The pictures and numbers may be part of a business card stored electronically, or a driver's license or other identification means so stored, that can be readily displayed on display 11 for this purpose.

Another example of how the invention may be used to exchange more detailed information is as follows. Advertisers and service or merchandise providers can utilize the invention in an exceptional way to communicate with people in a particular target area. For instance, a traveler entering a new geographic area, and indicating his presence there by means of his phone, can be sent several graphics, such as a Car Rental icon, an Hotel icon, a Restaurant icon, and/or an icon representing some other available service or merchant, from an advertiser database to his suitably equipped cellular phone. The transmitted information may be stored in a Graphic location-specific temporary phonebook in the traveler's phone. The graphic images or icons can be hierarchically arranged in categories with multiple entries under each category. By selecting and pressing on any of the received icons on the Interface display, the traveler can display or receive additional information and/or directly call a Customer Service Representative at a desired service location. Upon contacting a Representative, the traveler can discuss available choices, pictures of, or information on, which may be prestored with the icon in his Graphic phonebook for viewing and consideration during the conversation. Further graphical information may also be transmitted. The traveler may keep the icons and information in his location-specific temporary phonebook throughout the duration of his trip to be able to intuitively reach those services that are important to him, and then erase the phonebook when the trip is over.

In comparison to the known pagers that use icons to reach different parts of stored information, i.e., a phone for phone numbers, a book for addresses, the invention enables a user to utilize the airwaves to get detailed and related information into a cellular phone without having to go to the time and trouble of keying it in himself. Moreover, once the information reaches the cell phone, it is live, in the sense that it too activates the phone to make a call as the phone number is intuitively tied to the information.

The sender can also utilize graphical representations or icons to obtain selected responses to an inquiry. Recipients, having downloaded suitable graphical information in memory, can answer an inquiry by selecting one of the icons or replying with a selection of stored graphics images that have information tied to the icon, and then sending this information-rich graphic as a response to the inquiry or inquiries. Advertisers can utilize this capability to send immediately requested information in response to an icon, and have a universally recognized pictorial to lead the user to the information. For example, such pictorial information could include a map, if there is enough resolution in the display, indicating how to reach a location, as well as icons that represent different department phone numbers.

Taking a lead from off-air broadcast commercial television, which is free to the viewer in return for his sitting through commercials, it is contemplated that the geographic-specific advertising capabilities of the invention can be used by phone carriers to obtain advertising-supported revenues to subsidize the charges that they would normally charge their customers. If carriers are allowed to advertise on the handset, they could pass on this revenue in the form of lower charges to the phone user. With this subsidization, more phone customers might be able to use the service if they agree to be exposed to advertising on the network. Such advertising would work as follows. A carrier would act in the manner of a television network, in that it would sell air time for ad space. The highest price would be put on the best spot times. When users have their handsets ON, the empty space on the screen would accept advertising messages. These advertising messages could contain icons and additional information and could be tied to a phone number. Consumers could choose to call the number, or store the number in their handsets for later reference, using an icon. If no immediate action were taken, the advertisement, as on television, would just disappear.

Business to Business Users may also take advantage of the invention by utilizing a graphical representation of a person or business entity, whereby business users can swap electronic business cards. Unlike electronic organizers that require the manual entry and retrieval of phone information, and then the manual dialing of a telephone, the electronic icon addressing application of the invention allows users to exchange business cards by making a phone call using a graphic and affecting the transfer of a business card and its information to another business user. The receiver can store the landline home and business phone number, mobile number, pagers, and e-mail address with related graphical information in the cellular phone. Then, when the second user wants to contact the first user, he scrolls through his address book, and locates the person graphically; he then scrolls through the graphic icons for home, business, mobile, pager, e-mail, etc. and presses SEND upon display of the appropriate icon to contact the first user in the most desired manner and location.

It will be understood that the implementing software for the Interface unit must be written to accommodate its use with a given telephone or cellular network and first must provide the function or capability to tie a graphic to one or more phone numbers. In addition, the software must allow one user to send his or her graphical information to another user's Graphic electronic phonebook, or location-specific temporary phonebook. The code will be written using graphics as the enabling icon to sort through and retrieve tied information, and these graphics may also be tied to a message and/or more information. The details of producing the software for these purposes and functions in accordance with the invention must depend upon the system and context in which it is to be used and, although it may take various forms, this task will be readily within the skill of the art given the details of the features and functions of the invention as disclosed herein.

It will therefore be seen that the invention enables users, companies, and advertisers to use a phone to exchange graphics that are tied to phone numbers and store the exchanged information in the memory of the phone. Users wishing to make phone calls scroll through the different graphics, logos, or pictures displayed on the phone that define the person or location to be called, and then activate an appropriate graphic, upon seeing the desired icon and pressing a SEND key, to call the person selected. By adding graphics that can be received over the air to a cellular phone, use of that phone becomes much simpler. Names and numbers tied to the graphics are sent over the air and stored, so that people, places, and entities are easily recalled by the receiving phone's user through graphic recognition. All the necessary information may be sent via a wireless network and stored in the phone's memory. This relieves the user from having to manually enter information that is difficult to recall given the limitation of letters and numbers. This also relieves the user from having to carry a PDA or computer to generate responses or look up information that can be stored on the cellular phone. Thus, the disclosed use of graphics, which are readily recognized and utilized, renders the operation of telephones, such as cellular phones, extremely user-friendly.

What is claimed is:

1. A graphic user interface for use with an electronic phonebook in a telephone, comprising:
   means for tying phone numbers in said phonebook to respective graphic identifiers;
   means for displaying said graphic identifiers on a display screen of said telephone;
   means for selecting a graphic identifier on said displaying means;
   means, responsive to the selecting of a graphic identifier on said displaying means, for activating said telephone to call said respective tied phone number;
   means for storing and tying additional graphical information to said phone numbers in said phonebook along with said respective graphic identifiers; and
   means, responsive to the completion of a call to said respective tied phone number, for sending said additional graphical information and tied phone numbers to the telephone at said respective tied phone number.

2. An interface as in claim 1 further comprising:
   means for scrolling said respective graphic identifiers for successive display on said displaying means.

3. An interface as in claim 2 herein said selecting means comprises:
   means, connected to said phonebook, for accessing tied phone numbers therein;
   SEND means for pressing by a phone user when a respective graphic identifier to be selected is displayed and producing a signal in response to being pressed; and means, connected to said accessing means and said activating means and responsive to said signal produced by said SEND means, for communicating the phone number tied to said selected respective graphic identifier to said activating means when said SEND means is pressed.

4. An interface as in claim 1 wherein said tying means comprises:

a database with fields for storing pixel information of said graphic identifiers, and with fields for storing said respective tied phone numbers, and having indices for accessing said fields; and means for accessing both said graphic identifiers and said respective tied phone numbers by the same index into said database.

5. An interface as in claim 1 wherein said tying means comprises a database record holding both a graphic identifier and its respective tied phone number.

6. A telephone comprising:

an electronic phonebook for storing a plurality of phone numbers tied to respective graphic identifiers and additional information tied to respective graphic identifiers;

calling means for activating said telephone to call at least one of said plurality of phone numbers;

a display screen for displaying said graphic identifiers;

means for producing a scroll signal for scrolling said graphic identifiers on said display screen;

means for producing a select signal for selecting a graphic identifier displayed on said display screen;

interface means for controlling the providing of said graphic identifiers from said phonebook to said display screen in response to said scroll signal produced by said scrolling means, said interface means comprising:

means, responsive to the producing of a select signal selecting a graphic identifier on said display screen, for activating said calling means to call said respective phone number tied to the graphic identifier displayed on said display screens;

and wherein, said calling means further comprises means for sensing when a call has been completed and sending a connect signal, indicating a phone is available for receiving at the phone number called, to said interface means; and said interface means further comprises means, responsive to said connect signal, for sending said additional information tied to said graphic identifier displayed on said display screen to said available phone.

7. A telephone as in claim 6 wherein said activating means comprises a microprocessor.

8. A telephone as in claim 6 wherein said interface means further comprises means for storing said graphic identifiers.

9. A method of using a graphic identifier with an electronic phonebook in a telephone, to activate a phone call to a tied phone number, comprising the steps of:

tying phone numbers in said phonebook to respective graphic identifiers;

displaying said graphic identifiers on a display screen of said cellular phone;

selecting a graphic identifier on said display screen;

while the selected graphic identifier is being displayed on said display screen, activating said phone to call said respective tied phone number;

storing and tying additional graphical information to said phone numbers in said phonebook along with said respective graphic identifiers; and in response to the completion of a call to said respective tied phone number, sending said additional graphical information and tied phone numbers to the phone at said respective tied phone number.

10. The method of claim 9 wherein additional graphical information comprises advertising material.

11. The method of claim 9 wherein said step of selecting comprises:

pressing a phone element when a respective graphic identifier to be selected is displayed and producing a signal in response to said phone element being pressed;

accessing tied phone numbers from said phonebook; and in response to a signal produced by said phone element being pressed, communicating the phone number tied to said selected respective graphic identifier for activating said phone to call said respective tied phone number.

12. The method of claim 11 wherein said phonebook comprises a database with fields for storing pixel information of said graphic identifiers, and with fields for storing said respective tied phone numbers, and having indices for accessing said fields, and wherein both said graphic identifiers and said respective tied phone numbers are accessed by the same index into said database.

13. The method of claim 11 wherein said phonebook comprises a database record holding both a graphic identifier and its respective tied phone number.

14. The method of claim 9 comprising the further step of:

scrolling said respective graphic identifiers for successive display on said display screen.

* * * * *